(12) United States Patent
Decoster

(10) Patent No.: US 10,953,710 B2
(45) Date of Patent: Mar. 23, 2021

(54) TIRE WITH PRINTED STRAIN SENSORS

(71) Applicant: The Goodyear Tire & Rubber Company, Akron, OH (US)

(72) Inventor: Yves Francois Claude Decoster, Ethe (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 293 days.

(21) Appl. No.: 16/142,029

(22) Filed: Sep. 26, 2018

(65) Prior Publication Data

US 2020/0094633 A1 Mar. 26, 2020

(51) Int. Cl.
*B60C 23/06* (2006.01)
*B60C 23/00* (2006.01)
(Continued)

(52) U.S. Cl.
CPC ............ *B60C 23/064* (2013.01); *B33Y 80/00* (2014.12); *B60C 23/003* (2013.01); *G01L 9/04* (2013.01); *G01L 17/005* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061;
(Continued)

(56) References Cited

U.S. PATENT DOCUMENTS 6,105,423 A 8/2000 Prottey
7,249,498 B2 7/2007 Miyoshi et al. ........ E01C 23/00
(Continued)

FOREIGN PATENT DOCUMENTS

DE 102008054210 A1 6/2009

OTHER PUBLICATIONS

"A Novel Strain-based Method to Estimate Tire Conditions Using Fuzzy Logic for Intelligent Tires", Garcia-Pozuelo, et al.; *Sensors*, published 2017.

*Primary Examiner* — Andre J Allen
(74) *Attorney, Agent, or Firm* — Edward T. Kennedy

(57) ABSTRACT

A tire with printed strain sensors includes a pair of bead areas and a ground-contacting tread disposed radially outwardly of the pair of bead areas. Each one of a pair of sidewalls extends from a respective bead area to the tread. A carcass extends toroidally between each of the bead areas radially inwardly of the tread, and an innerliner is formed on an inside surface of the carcass. A pair of resistive strain sensors is printed on the innerliner, and includes a first strain sensor printed on the innerliner at an inboard rim flange area and a second strain sensor printed on the innerliner at an outboard rim flange area.

17 Claims, 3 Drawing Sheets

(51) Int. Cl.
*B33Y 80/00* (2015.01)
*G01L 9/04* (2006.01)
*G01L 17/00* (2006.01)

(58) Field of Classification Search
CPC ... B60C 11/243; B60C 99/00; B60C 11/0083;
B60C 13/003; B60C 2009/2038; B60C
23/004; B60C 23/02; B60C 23/0401;
B60C 23/0406; B60C 23/0416; B60C
23/0433; B60C 23/0455; B60C 23/0459;
B60C 23/0474; B60C 23/0489; B60C
23/0491; B60C 25/002; B60C 25/005;
B60C 25/007; B60C 29/02; B60C 3/04;
B60C 99/006; B60C 11/0332; B60C
11/24; B60C 13/001; B60C 13/02; B60C
15/0036; B60C 17/02; B60C 2009/0071;
B60C 2009/2022; B60C 2200/02; B60C
2200/06; B60C 2200/065; B60C 23/00;
B60C 23/001; B60C 23/003; B60C
23/007; B60C 23/008; B60C 23/0413;
B60C 23/0427; B60C 23/0447; B60C
23/0454; B60C 23/0457; B60C 23/0462;
B60C 23/0471; B60C 23/0472; B60C
23/0476; B60C 23/0479; B60C 23/0484;
B60C 23/065; B60C 23/066; B60C 23/10;
B60C 25/0548; B60C 25/056; B60C
25/132; B60C 25/138; B60C 29/005;
B60C 9/005; B60C 9/18; B60C 9/1807;
B60C 9/20; B60C 9/28; G01L 17/00;
G01L 17/005; G01L 19/0645; G01L
19/147; G01L 1/16; G01L 1/18; G01L
7/187; G01L 9/0052; G01L 9/008
USPC .................................................. 73/146–146.8
See application file for complete search history.

(56) References Cited

U.S. PATENT DOCUMENTS

| | | | |
|---|---|---|---|
| 8,661,885 B1* | 3/2014 | Singh | B60C 23/064 73/146 |
| 2007/0251619 A1* | 11/2007 | Bertrand | B60C 23/064 152/152.1 |
| 2007/0256485 A1* | 11/2007 | Rensel | B60C 23/0493 73/146 |
| 2007/0272006 A1* | 11/2007 | Demaie | B60C 19/00 73/146 |
| 2008/0289407 A1* | 11/2008 | Gramling | G01P 15/09 73/146.5 |
| 2014/0163816 A1 | 6/2014 | Singh et al. | B60C 23/00 |
| 2015/0217607 A1* | 8/2015 | Singh | B60C 23/0493 152/510 |
| 2015/0266717 A1* | 9/2015 | Okamoto | B81B 3/0091 257/418 |
| 2015/0331533 A1* | 11/2015 | McMillen | A61B 5/6843 345/174 |
| 2016/0290880 A1* | 10/2016 | Lewis | G06F 3/014 |
| 2016/0318356 A1* | 11/2016 | McMillen | G01B 7/06 |
| 2017/0234745 A1* | 8/2017 | Choi | G01L 17/00 73/146.3 |

* cited by examiner

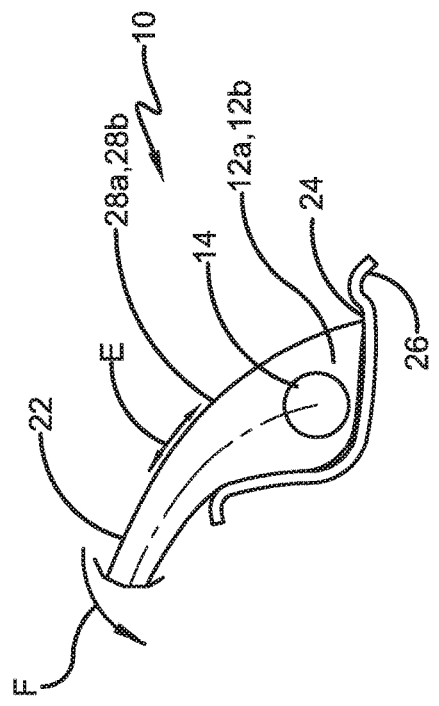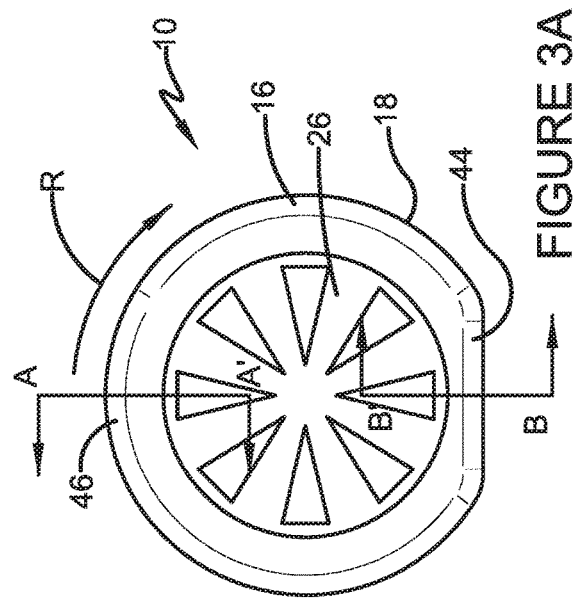

TIRE WITH PRINTED STRAIN SENSORS

FIELD OF THE INVENTION

The invention relates to tires. More particularly, the invention relates to tires with electronic sensors that sense various conditions within a tire. Specifically, the invention is directed to a tire that includes strain sensors which are printed on the innerliner of the tire that enable accurate determination of tire load.

BACKGROUND OF THE INVENTION

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

For many modern tires, it is often desirable to mount electronic components to the tires either before or after curing. Such electronic components enable certain tire parameters to be monitored. For example, in the prior art, discrete electronic strain sensor units have been attached to the inside surface of the pneumatic tire, which is known as the tire innerliner, using an adhesive. Such strain sensors measure the strain in the sidewall of the tire to provide data which can be used to determine the load on the tire. Such data can be communicated to vehicle stability and/or braking systems to provide improved control of the vehicle, and can be used for monitoring or tracking driving behavior.

While prior art discrete electronic strain sensor units are acceptable for their intended purpose, it is desirable to improve the accuracy of measurements of strain to determine tire load in a more precise and repeatable manner. By way of background, a typical prior art strain sensor includes a long, thin strip of conductive material arranged to form a zigzag pattern of parallel lines, which is attached to a substrate material. An excitation voltage is applied to terminal ends of the strip and electrical resistance is then measured. The stress on the tire at the location of the sensor may be calculated from the measured resistance, as known to those skilled in the art. Other strain sensors known in the art involve measuring electrical capacitance of the conductive material or using optical fibers.

In the prior art, when a discrete electronic strain sensor unit is attached to the tire innerliner, it is adhered to the innerliner in order to preserve the integrity of the innerliner. However, due to variance in adhesives, the pressure applied to the sensor unit, and/or locating techniques, sensor units may not be uniformly applied to the tire innerliner, which is known as manufacturing dispersion. Such manufacturing dispersion may lead to less-than-optimum indication of strain, which in turn may reduce the accuracy of the determination of tire load.

Likewise, as a discrete electronic strain sensor undergoes repeated deformation cycles, the measurement of resistance may change and become less accurate, which is known as aging effect. Such aging effect may again lead to less-than-optimum indication of strain, which in turn may reduce the accuracy of the determination of tire load.

As a result, it is desirable to develop a tire with strain sensors that include features which desirably reduce manufacturing dispersion and aging effect, thereby improving the indication of strain and the accuracy of the determination of tire load.

SUMMARY OF THE INVENTION

According to an aspect of an exemplary embodiment of the invention, a tire with printed strain sensors is provided. The tire includes a pair of bead areas and a ground-contacting tread disposed radially outwardly of the pair of bead areas. Each one of a pair of sidewalls extends from a respective bead area to the tread. A carcass extends toroidally between each of the bead areas radially inwardly of the tread, and an innerliner is formed on an inside surface of the carcass. A pair of resistive strain sensors is printed on the innerliner.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Radial-ply tire" means a belted or circumferentially-restricted pneumatic tire in which the ply cords which extend from bead to bead are laid at cord angles between about 65 to about 90 degrees with respect to the equatorial plane of the tire.

"TPMS" means a tire pressure monitoring system, which is an electronic system that measures the internal pressure of a tire and is capable of communicating the pressure to a processor that is mounted on the vehicle and/or is in electronic communication with electronic systems of the vehicle.

BRIEF DESCRIPTION OF DRAWINGS

The invention will be described by way of example and with reference to the accompanying drawings, in which:

FIG. 3a is a schematic representation of an outboard side of the tire shown in FIG. 1 mounted on a wheel;

FIG. 3b is an enlarged cross-sectional view of a portion of the tire and wheel shown in FIG. 3a;

FIG. 3c is a schematic cross-sectional view taken along line A-A' in FIG. 3a;

FIG. 3d is a schematic cross-sectional view taken along line B-B' in FIG. 3a;

FIG. 5b is a graphical representation of the sensors shown in FIG. 5a.

Similar numerals refer to similar parts throughout the drawings.

DETAILED DESCRIPTION OF THE INVENTION

Figure 1:
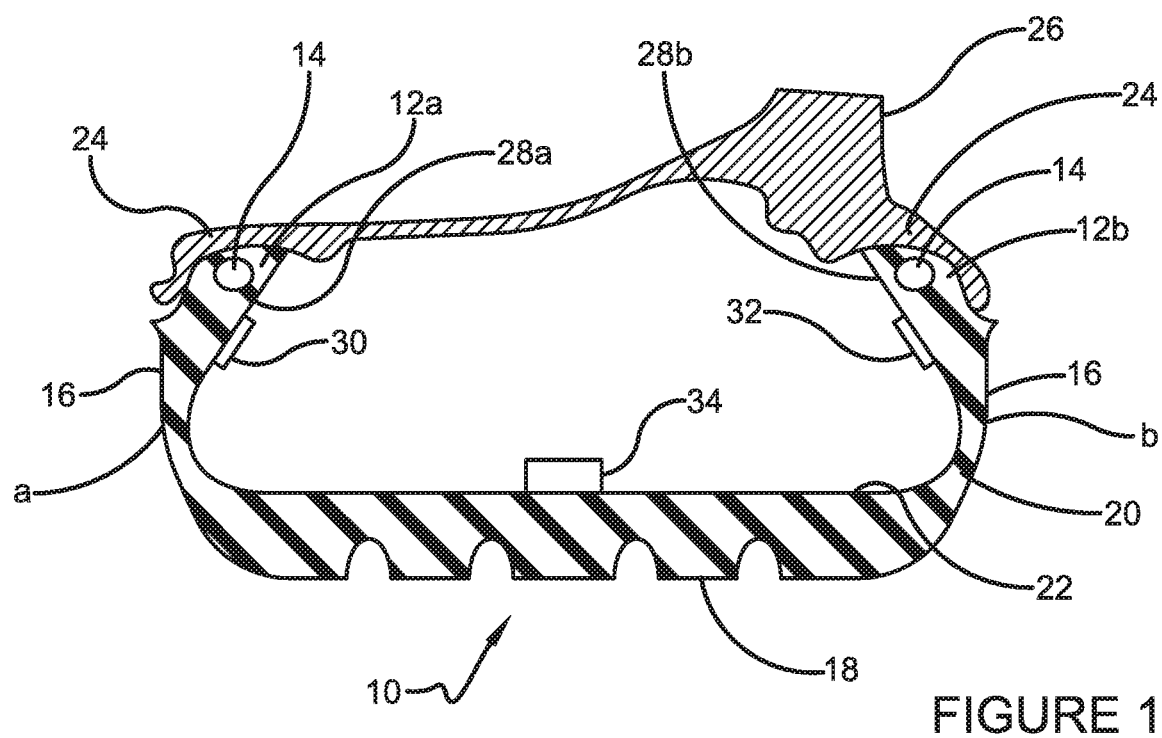
FIG. 1 is a schematic cross-sectional view of a portion of an exemplary embodiment of a tire with printed strain sensors of the present invention.

An exemplary embodiment of a tire of the present invention is indicated generally at 10, and is shown in FIG. 1. The tire 10 includes a pair of bead areas 12a and 12b, each one of which is formed with a bead core 14 that is embedded in the respective bead areas. Each one of a pair of sidewalls 16 extends radially outward from a respective bead area 12a and 12b to a ground-contacting tread 18. The tire 10 is reinforced by a carcass 20 that toroidally extends from one bead area, such as an inboard bead area 12a, to the other bead area, such as an outboard bead area 12b, as known to those skilled in the art. An innerliner 22 is formed on the inner or inside surface of the carcass 20. The tire 10 is mounted on the flange 24 of a wheel or rim 26, as known in the art.

The tire 10 includes an inboard surface indicated generally by the letter "a" and an outboard surface indicated generally by the letter "b". The innerliner 22 includes an inboard rim flange area 28a, which is the portion of the innerliner near the inboard bead area 12a, and an outboard rim flange area 28b, which is the portion of the innerliner near the outboard bead area 12b.

A first or inboard strain sensor 30, which preferably is a resistive strain sensor, is printed on the innerliner 22 at the inboard rim flange area 28a. A second or outboard strain sensor 32, which preferably also is a resistive strain sensor, is printed on the innerliner 22 at the outboard rim flange area 28b. The sensors 30 and 32 measure the elongation of the innerliner 22 produced by the flexion of the tire at the rim flange areas 28a and 28b, enabling the lateral force and load of the tire 10 to be determined, as will be explained in greater detail below.

The strain sensors 30 and 32 are disposed in the same horizontal plane extending laterally across the tire 10, and preferably are in electronic communication with a TPMS sensor unit 34. The TPMS sensor unit 34 is attached to the innerliner 22 by an adhesive or other means known to those skilled in the art, and typically includes a processor and an antenna or other communication means for communicating data to an external processor. Preferably, the strain sensors 30 and 32 are in wireless communication with the TPMS sensor unit 34, thereby enabling the TPMS sensor unit to transmit strain measurements from the strain sensors to the external processor for the calculation of lateral forces and load of the tire 10.

Each sensor 30 and 32 preferably is directly printed on the respective innerliner rim flange area 28a and 28b by ink-jet printing or by three-dimensional (3D) printing. Each sensor 30 and 32 is printed using a conductive ink 36 (FIG. 2) with a known electrical resistance, and which is flexible. The printing of the sensors 30 and 32 on the innerliner 22 is performed according to inkjet printing or 3D printing techniques that are known to those skilled in the art.

The sensors 30 and 32 may be printed directly on the innerliner 22 at each respective flange area 28a and 28b. Such direct printing enables the sensors 30 and 32 to directly sense deformation of the innerliner 22 without any intervening structure or additional media. Stability of the conductive ink 36 over a range of temperatures enables direct printing of each sensor 30 and 32 on the innerliner 22 before curing of the tire 10 or after curing of the tire.

Alternatively, each sensor 30 and 32 may be printed on a discrete substrate such as foil, rubber, plastic or a combination thereof. Preferably, the substrate is of a flexible and soft rubber-foil compound that has a short relaxation time, which enables each sensor 30 and 32 to sense flex of the tire 10, as will be described in greater detail below, without any distortion or loss of sensitivity. The combination substrate and sensor 30 and 32 may be attached to the innerliner at each respective flange area 28a and 28b using an adhesive, ultrasonic welding, or other techniques known to those skilled in the art. Stability of the conductive ink 36 over a range of temperatures enables attachment of the substrate and sensor 30 and 32 to the innerliner 22 before curing of the tire 10 or after curing of the tire. Installing a substrate and sensor 30 and 32 on an after-cured tire 10 enables each sensor to be manufactured independently of the tire and provides independent quality control for the sensors separate from the tire. In addition, the use of a substrate and sensor 30 and 32 may enable a variety of options in the electrical connection and electronic communication between the sensors and the TPMS sensor unit 34.

Figure 2:
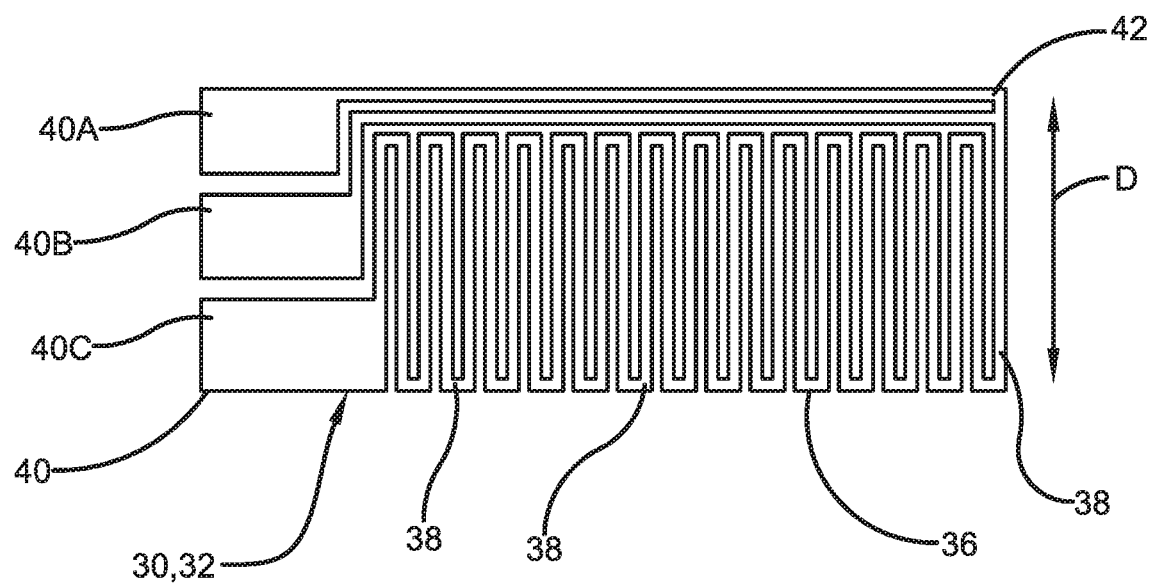
FIG. 2 is a schematic representation of an exemplary embodiment of a printed strain sensor for the tire shown in FIG. 1.

Turning now to FIG. 2, each sensor 30 and 32 includes a specific configuration in order to optimize the measurement of flexion and elongation of the tire 10. The conductive ink 36 is deposited in a long, thin strip arranged to form a zigzag pattern of parallel elements 38 with a plurality of terminals 40 and a perpendicular element 42. The arrangement of parallel elements 38 increases the sensitivity of each sensor 30 and 32 in a specific direction or axis indicated by arrow D, which extends parallel to the parallel elements and is referred to herein as the sensitive axis.

The plurality of terminals 40 preferably includes a first terminal 40A, a second terminal 40B and a third terminal 40C. The perpendicular element 42 extends from the first terminal 40A in a direction perpendicular to the sensitive axis D. The zigzag pattern of elements 38 extends between the second terminal 40B and the third terminal 40C.

Preferably, each sensor 30 and 32 provides or delivers signals as determined by the arrangement of the elements 38 and the terminals 40. The first signal of each sensor 30 and 32, referred to herein as 40B:40C, is a measurement of strain between a first end of the zigzag pattern of elements 38 at the second terminal 40B and a second end of the zigzag pattern of elements at the third terminal 40C. The second signal of each sensor 30 and 32, referred to as 40A:40B, is a reference signal, which is a measurement between the perpendicular element 42 the first terminal 40A and the first end of the zigzag pattern of elements at the second terminal 40B. The first signal 40B:40C and the second signal 40A:40B are both proportional to the resistivity of the ink 36.

In addition, the second signal 40A:40B is proportional to the elongation of the sensor 30 and 32 in a direction perpendicular to the sensitive axis D. As a result, the second or reference signal 40A:40B may be used to negate or cancel out the response of each respective sensor 30 and 32 due to any elongation that may occur in the direction perpendicular to the sensitive axis D, which enhances the directional sensitivity of each sensor.

The value of the second or reference signal 40A:40B is subtracted from the value of the first signal 40B:40C, shown as 40B:40C-40A:40B, to obtain a representation of the elongation of each respective sensor 30 and 32 along the sensitive axis D. When the representation 40B:40C-40A:40B is divided by the value of the second or reference signal 40A:40B, the result is a normalized value of the resistivity of the ink 36. By obtaining a normalized value of the resistivity of the ink 36, each sensor 30 and 32 is capable of real-time calibration, which reduces potential changes in the resistivity of the ink 36 due to manufacturing, thereby reducing manufacturing dispersion. In addition, such real-time calibration of each sensor 30 and 32 reduces potential changes in the resistivity of the ink 36 due to aging, thereby reducing aging effect.

Because the printed sensors 30 and 32 may be more sensitive to positive strain or elongation than negative strain or compression, the positioning of the sensors on the innerliner 22 is an important feature in obtaining optimum signals. With reference now to FIGS. 3a and 3d, as the tire 10 rotates, which is indicated by arrow R, a lower portion 44 of each sidewall 16 that is at the ground flexes due to the load on the tire and the contact of the tire with the ground or road. As shown in FIGS. 3a and 3c, an opposite or upper portion 46 of each sidewall 16 that is not near the ground does not flex.

With particular reference now to FIGS. 3a, 3b and 3d, in the lower portion 44 of each sidewall 16 that is flexing, as indicated by arrow F, an extension E of the innerliner is created at the top of each respective rim flange area 28a and 28b. During such flexing F, the most significant deformation is in the radial direction of the tire 10 at each respective rim flange area 28a and 28b. As a result, each sensor 30 and 32 is configured and positioned to align the sensitive axis D (FIG. 2) with the radial direction of the tire 10 at each respective rim flange area 28a and 28b.

Figure 4:
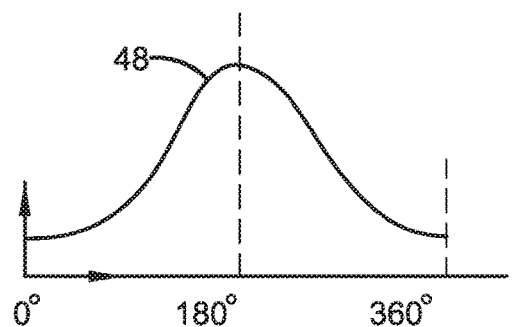
FIG. 4 is a graphical representation of a signal of a sensor shown in FIG. 3d.

When each sensor 30 and 32 is attached to the respective rim flange area 28a and 28b of the innerliner 22, and the sensitive axis D is aligned with the radial direction of the tire 10, an optimum signal 48, as shown in FIG. 4, is obtained from each sensor. The optimum signal 48 is the representation of the elongation of each respective sensor 30 and 32 along the sensitive axis D obtained according to the signal calculation described above, and is proportional to the flex F of the tire 10.

The flex F of the tire 10 at each respective rim flange area 28a and 28b of the innerliner 22 is proportional to the tire load and to the tire inflation pressure. Therefore, when each sensor 30 and 32 is in communication with the TPMS sensor unit 34, the signal 48 obtained from each printed strain sensor may be combined with the pressure of the tire 10 as indicated by the TPMS sensor unit to enable determination of the tire load.

Figure 5A:
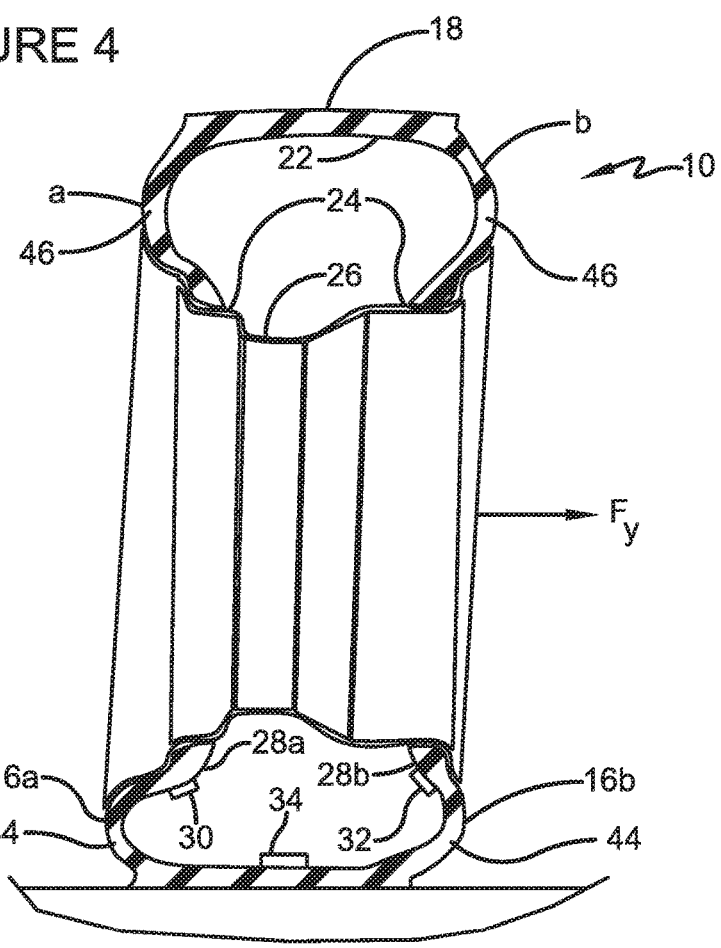
FIG. 5a is a schematic cross-sectional view of the tire shown in FIG. 1 in a cornering condition.
Figure 5B:
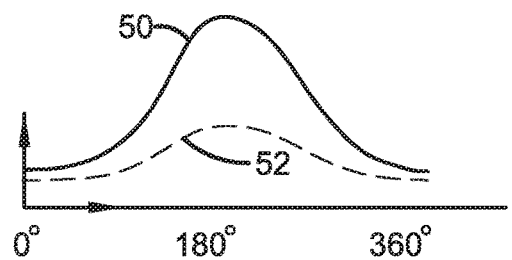

Referring now to FIGS. 5a and 5b, the tire 10 is shown in a cornering condition. In such a cornering condition, the lower portion 44 of each respective sidewall 16 flexes in a different manner. More particularly, the lower portion 44 of the inboard sidewall 16a experiences more flex than the lower portion 44 of the outboard sidewall 16b. This is because the lower portion 44 of the inboard sidewall 16a experiences a more pronounced contact pressure on the top of the inboard rim flange area 28a than that of the outboard sidewall 16b and the top of the outboard rim flange area 28b.

In such a situation, the separate signals of the inboard sensor 30 on the inboard rim flange area 28a and the outboard sensor 32 on the outboard rim flange area 28b are compared. More particularly, a signal 50 from the inboard sensor 30 and a signal 52 from the outboard sensor 32 are measured simultaneously. The stronger signal typically will be the signal 50 from the inboard sensor 30 due to the greater flex at the inboard rim flange area 28a as described above. Likewise, the signal 52 from the outboard sensor 32 will typically weaker due to less flex at the outboard rim flange area 28b.

The difference between the signals, which is the value of the signal 50 from the inboard sensor 30 minus the value of the signal 52 from the outboard sensor 32, correlates to the difference in the deformation occurring in each sidewall 16a and 16b of the tire 10. The difference in deformation of each sidewall 16a and 16b is directly proportional to the lateral forces acting on the tire 10, indicated by arrow Fy in FIG. 5a. The sum of the signals, which is the value of the signal 50 from the inboard sensor 30 plus the value of the signal 52 from the outboard sensor 32, directly correlates to the load condition of the tire 10, enabling determination of the total vertical load and/or the dynamic load on the tire.

In this manner, the tire 10 with printed strain sensors 30 and 32 of the present invention, including the structural features described above, desirably reduces manufacturing dispersion and aging effect, and improves the indication of strain and the accuracy of the determination of tire load.

The present invention also includes a method of forming a tire 10 with printed strain sensors 30 and 32, and a method of determining tire load for a tire with printed strain sensors. Each method includes steps in accordance with the description that is presented above and shown in FIGS. 1 through 5b.

It is to be understood that the structure of the above-described tire 10 may be altered or rearranged, or components or steps known to those skilled in the art omitted or added, without affecting the overall concept or operation of the invention. For example, while two strain sensors 30 and 32 have been described, more than two sensors may be employed.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire with printed strain sensors, comprising:
   a pair of bead areas;
   a ground-contacting tread disposed radially outwardly of the pair of bead areas;
   a pair of sidewalls, in which each sidewall extends from a respective bead area to the tread;
   a carcass extending toroidally between each of the bead areas radially inwardly of the tread;
   an innerliner formed on an inside surface of the carcass; and
   a pair of resistive strain sensors printed on the innerliner, each strain sensor including a conductive ink with a known electrical resistance, the conductive ink being deposited in a strip arranged to form a zigzag pattern of parallel elements extending parallel to a sensitive axis aligned with a radial direction of the tire, a perpendicular element extending perpendicular to the sensitive axis, and a plurality of terminals.

2. The tire with printed strain sensors of claim 1, wherein the pair of resistive strain sensors includes a first strain sensor printed on the innerliner at an inboard rim flange area and a second strain sensor printed on the innerliner at an outboard rim flange area.

3. The tire with printed strain sensors of claim 1, wherein the strain sensors are disposed in the same horizontal plane extending laterally across the tire.

4. The tire with printed strain sensors of claim 1, wherein the strain sensors are in electronic communication with a tire pressure monitoring system.

5. The tire with printed strain sensors of claim 1, wherein each strain sensor is printed on the innerliner by at least one of ink-jet printing and three-dimensional printing.

6. The tire with printed strain sensors of claim 1, wherein each strain sensor is printed on the innerliner before curing of the tire.

7. The tire with printed strain sensors of claim 1, wherein each strain sensor is printed on the innerliner after curing of the tire.

8. The tire with printed strain sensors of claim 1, wherein each sensor is printed directly on the innerliner.

9. The tire with printed strain sensors of claim 1, wherein each sensor is printed on a substrate that is attached to the innerliner.

10. The tire with printed strain sensors of claim 9, wherein the substrate includes a rubber-foil compound.

11. The tire with printed strain sensors of claim 1, wherein the plurality of terminals includes a first terminal connected to the perpendicular element, a second terminal connected to a first end of the parallel elements and a third terminal connected to a second end of the parallel elements.

12. The tire with printed strain sensors of claim 11, wherein a first signal from each sensor includes a measurement of strain between the second terminal and the third terminal, the first signal being proportional to elongation of the respective sensor in a direction perpendicular to the sensitive axis.

13. The tire with printed strain sensors of claim 12, wherein a second signal from each sensor includes a measurement between the first terminal and the second terminal, the second signal canceling out a response of the respective sensor due to elongation occurring in a direction perpendicular to the sensitive axis.

14. The tire with printed strain sensors of claim 13, wherein a normalized value of the resistivity of each sensor is obtained by:
    subtracting a value of the second signal from a value of the first signal to yield a representation of elongation of the respective sensor along the sensitive axis; and
    dividing the representation of elongation by the value of the second signal.

15. The tire with printed strain sensors of claim 13, wherein the first signal is proportional to a flex of the tire and, when combined with a pressure of the tire, enables determination of tire load.

16. A tire with printed strain sensors, comprising:
    a pair of bead areas;
    a ground-contacting tread disposed radially outwardly of the pair of bead areas;
    a pair of sidewalls, in which each sidewall extends from a respective bead area to the tread;
    a carcass extending toroidally between each of the bead areas radially inwardly of the tread;
    an innerliner formed on an inside surface of the carcass; and
    a pair of resistive strain sensors printed on the innerliner, the pair of resistive strain sensors including a first strain sensor printed on the innerliner at the inboard rim flange area and a second strain sensor printed on the innerliner at the outboard rim flange area, and when the tire is in a cornering condition, the first strain sensor produces a first sensor signal and the second strain sensor produces a second sensor signal, in which a difference between the first sensor signal and the second sensor signal correlates to a difference in the deformation occurring in each sidewall that is proportional to a lateral force acting on the tire.

17. The tire with printed strain sensors of claim 16, wherein a sum of the first sensor signal and the second sensor signal correlates to a load condition of the tire.

* * * * *